US009560319B1

(12) United States Patent
Pan et al.

(10) Patent No.: US 9,560,319 B1
(45) Date of Patent: Jan. 31, 2017

(54) AUDIOVISUAL INFORMATION PROCESSING IN VIDEOCONFERENCING

(71) Applicant: International Business Machines Corporation, Armonk, NY (US)

(72) Inventors: Yang Pan, Beijing (CN); Wei Su, Beijing (CN); Yi Zhang, Beijing (CN); Yi Jian Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/098,449

(22) Filed: Apr. 14, 2016

Related U.S. Application Data

(63) Continuation of application No. 14/878,055, filed on Oct. 8, 2015.

(51) Int. Cl.
*H04N 7/15* (2006.01)

(52) U.S. Cl.
CPC ...................................... *H04N 7/15* (2013.01)

(58) Field of Classification Search
CPC ............ H04N 7/15; H04N 7/152; H04N 7/14; H04N 7/142
USPC ..... 348/14.01–14.16; 370/260–261; 715/753
See application file for complete search history.

(56) References Cited

U.S. PATENT DOCUMENTS

| 5,835,129 A | 11/1998 | Kumar |
| 6,317,776 B1 * | 11/2001 | Broussard ................ H04N 7/15 348/E7.083 |
| 6,452,974 B1 | 9/2002 | Menon et al. |
| 7,558,221 B2 | 7/2009 | Nelson et al. |
| 7,636,662 B2 | 12/2009 | Dimtrova et al. |
| 7,768,543 B2 | 8/2010 | Christiansen |
| 7,817,180 B2 | 10/2010 | Jeong et al. |
| 8,406,608 B2 | 3/2013 | Dubin et al. |
| 8,514,265 B2 | 8/2013 | Goyal et al. |
| 9,225,938 B2 | 12/2015 | Gwilt et al. |
| 2005/0099492 A1 | 5/2005 | Orr |
| 2006/0251384 A1 | 11/2006 | Vronay et al. |
| 2007/0292113 A1 | 12/2007 | Tsou et al. |
| 2013/0100352 A1 | 4/2013 | McGowan et al. |
| 2016/0094475 A1 * | 3/2016 | Lynch ..................... H04L 47/19 348/14.12 |

OTHER PUBLICATIONS

"FastMeeting V3.8.8", Printed Sep. 10, 2015, 1 page, <http://www.fsmeeting.com/download_en.html>.
"Telepresence & Video Conferencing", © 2015 Huawei Technologies Co., Ltd., Printed Sep. 10, 2015, 4 pages, <http://e.huawei.com/en/products/enterprise-networking/telepresence-video-conferencing>.

(Continued)

*Primary Examiner* — Melur Ramakrishnaiah
(74) *Attorney, Agent, or Firm* — Gilbert Harmon, Jr.

(57) ABSTRACT

Embodiments of the present invention relate to audiovisual stream processing in videoconferences. For each audiovisual stream in a videoconference, a sound level of the audiovisual stream is detected. If the sound level exceeds a predefined threshold level, the audiovisual stream is processed with a first configuration. If the sound level is below the predefined threshold level, the audiovisual stream is processed with a second configuration. The second configuration is more resource-effective than the first configuration.

1 Claim, 6 Drawing Sheets

(56) References Cited

OTHER PUBLICATIONS

"Video Conferencing", © 1998-2015 ZTE Corporation, Printed Sep. 10, 2015, 3 pages, <http://wwwen.zte.com.cn/en/products/anyservice/industr_enterprise/video_conferencing/>.
"Video Conferencing Systems", © Hitachi Systems, Ltd. 2011, 2015, Printed Sep. 11, 2015, 2 pages, <http://www.hitachi-systems.com/global_en/solution/g-07/index.html>.
Pan et al., "Audiovisual Information Processing in Videoconferencing", U.S. Appl. No. 14/878,055, filed Oct. 8, 2015, 29 pages.
IBM Appendix P, list of patents or patent applications treated as related, Jul. 18, 2016, 2 pages.

\* cited by examiner

AUDIOVISUAL INFORMATION PROCESSING IN VIDEOCONFERENCING

BACKGROUND OF THE INVENTION

The present invention relates generally to the field of videoconferencing, and more particularly to processing audiovisual streams in a videoconference.

Videoconferencing is an essential and indispensable part of today's communication. It is a very cost effective alternative to in-person meetings and allows for bringing people together regardless of locations to exchange ideas in real time and in an interactive manner. A videoconference involves a live exchange and mass articulation of video and audio information among two or more participants who are remote from one another but linked by a telecommunication system.

Sometimes the content of a videoconference needs to be recorded, for example, when the videoconference is related to important topics and key problems or for the purpose of an archive. Conventionally, the recorded information includes video and audio signals from each participant. Such a recording process consumes considerable computing and storage resources. In addition, in a real-time videoconference, equivalent processing of all audiovisual streams will degrade the rate of data transmission and processing, thereby impacting performance of the videoconference.

SUMMARY

In one embodiment, a method for processing a plurality of audiovisual streams in a videoconference, the method comprising: detecting a sound level of an audiovisual stream in a videoconference based on determining an average sound level of the audiovisual stream over a predefined time period, decomposing the audiovisual stream into an audio component and a video component and analyzing the audio component to determine the sound level wherein analyzing the audio component is based on at least one of sound intensity, sound pressure, sound power, sound energy density and sound loudness; in response to the sound level exceeding a first predefined threshold level, processing the audiovisual stream with a first configuration based on a first quality level wherein exceeding the first predefined threshold level comprises determining that the sound level of the audiovisual stream does not fall below the first predefined threshold level for a sequential time period greater than a predefined threshold time period; in response to the sound level being below the first predefined threshold level and above a second predefined sound level, processing the audiovisual stream with a second configuration based on a second quality level, wherein the second configuration is more resource-effective than the first configuration and the second quality level is lower than the first quality level wherein the first quality level and the second quality level are based on at least one of frequency response, signal-to-noise ratio, stereo crosstalk, and output power; in response to the sound level being below the second predefined sound level, discarding the audiovisual stream; superimposing the audio component of the audiovisual stream with audio components of further audiovisual streams associated with the videoconference wherein the further audiovisual streams are processed with the first configuration; combining the video component of the audiovisual stream with video components of the further audiovisual streams; and rendering the audiovisual stream in a display area, wherein an appearance of the display area is determined based on the sound level of the audiovisual stream.

It is to be understood that the Summary is not intended to identify key or essential features of embodiments of the present invention, nor is it intended to be used to limit the scope of the present invention. Other features of the present invention will become easily comprehensible through the description below.

DETAILED DESCRIPTION

Embodiments of the present invention provide a method, a computer system, and a computer program product for processing audiovisual streams in a videoconference.

Principle of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
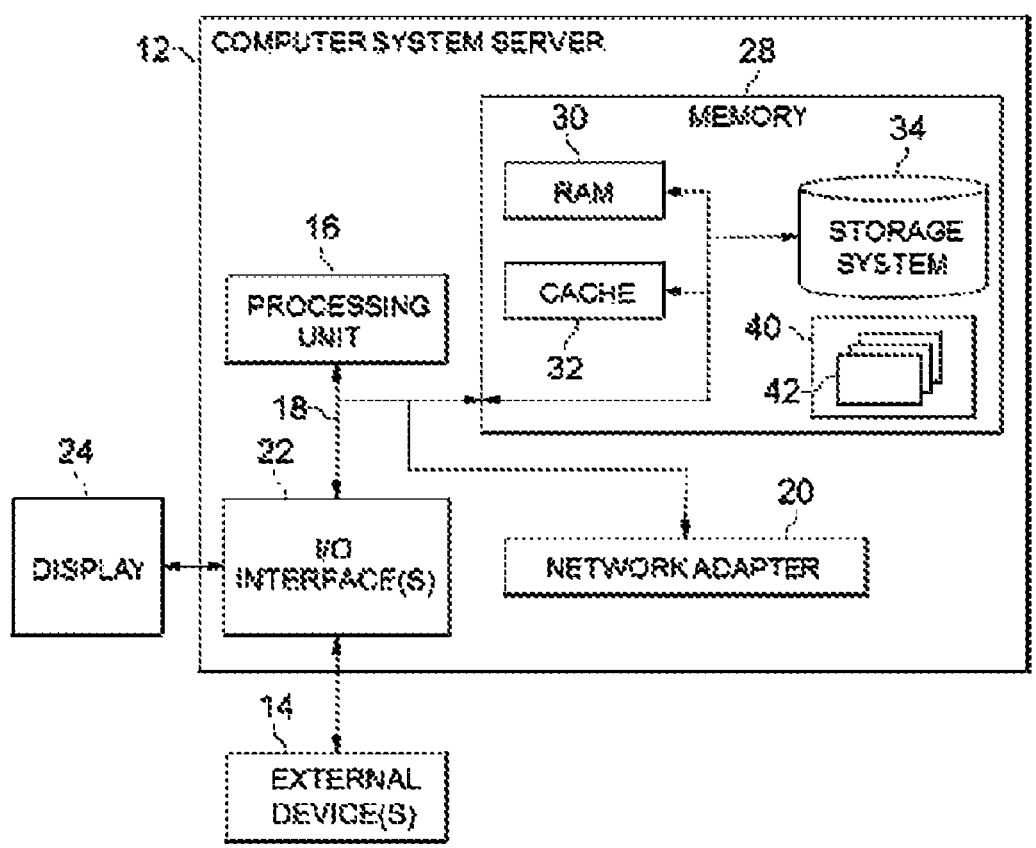
FIG. 1 is a block diagram of internal and external components of a computer system, in accordance with an embodiment of the present invention.

Reference is first made to FIG. 1, in which an exemplary electronic device or computer system server 12 which is applicable to implement the embodiments of the present invention is shown. Computer system server 12 is only illustrative and is not intended to suggest any limitation as to the scope of use or functionality of embodiments of the invention described herein.

As shown in FIG. 1, computer system server 12 is shown in the form of a general-purpose computing device. The components of computer system server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system server 12 typically includes a variety of computer system readable media. Such media may be any available media that is accessible by computer system server 12, and it includes both volatile and non-volatile media, removable and non-removable media.

System memory 28 can include computer system readable media in the form of volatile memory, such as random access memory (RAM) 30 and/or cache memory 32. Computer system server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system server 12 may also communicate with one or more external devices 14 such as a keyboard, a printing device, display 24, and the like. One or more devices that enable a user to interact with computer system server 12; and/or any devices (e.g., network card, modem, etc.) that enable computer system server 12 to communicate with one or more other computing devices. Such communication can occur via input/output (I/O) interfaces 22. Still yet, computer system server 12 can communicate with one or more networks such as a local area network (LAN), a general wide area network (WAN), and/or a public network (e.g., the Internet) via network adapter 20. As depicted, network adapter 20 communicates with the other components of computer system server 12 via bus 18. It should be understood that although not shown, other hardware and/or software components could be used in conjunction with computer system server 12. Examples, include, but are not limited to: microcode, device drivers, redundant processing units, external disk drive arrays, RAID systems, tape drives, and data archival storage systems, and the like.

In computer system server 12, I/O interfaces 22 may support one or more of various different input devices that can be used to provide input to computer system server 12. For example, the input device(s) may include a user device such as a keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
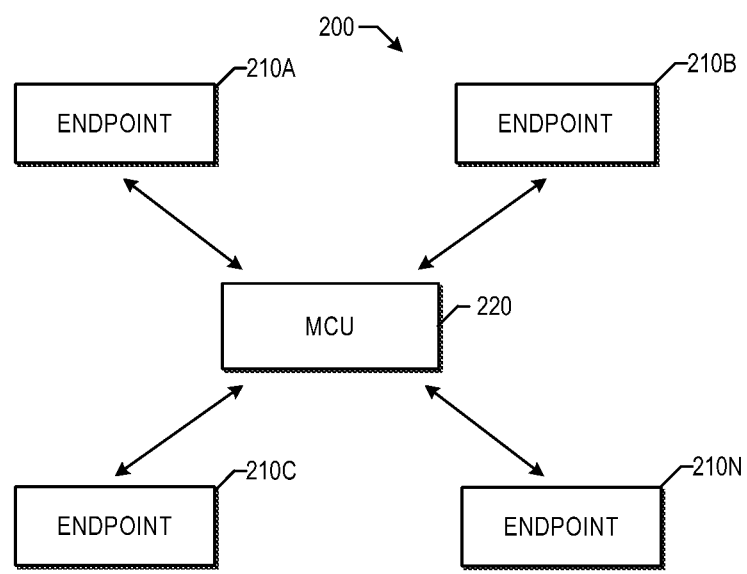
FIG. 2 is a block diagram of a videoconferencing system, in accordance with an embodiment of the present invention.

FIG. 2 shows a block diagram of a videoconferencing system, 200, in which example embodiments of the present invention may be implemented. As shown, videoconferencing system 200 includes two or more client devices or endpoints 210A, 210B, 210C, . . . , and 210N which are collectively referred to as endpoint(s) 210. It is to be understood that although four endpoints are shown in the figure, the number of the endpoints is not limited thereto. Endpoint 210 is a device that enables a user to join a videoconference with one or more users of other endpoints. Each endpoint 210 includes hardware and software resources required to support the videoconference. Examples of endpoint 210 may include, but are not limited to, a desktop personal computer (PC), a tablet PC, a portable PC, a mobile terminal, a smart phone, or the like. In the videoconference, endpoint 210 is configured to capture the video and audio signals from the user in real time. For example, endpoint 210 may be equipped with a camera(s) and a microphone(s) for capturing the video and audio signals, respectively. Endpoint 210 may encode, compose, compress and/or otherwise process the captured video and audio signals to form an audiovisual stream.

In the example shown in FIG. 2, videoconferencing system 200 includes a server or multipoint control unit (MCU) 220 connected to endpoints 210. MCU 220 may be implemented by computer system server 12 as discussed above with reference to FIG. 1, for example. MCU 220 is a device that bridges videoconferencing connections. MCU 220 can be connected to endpoints 210 by any suitable medium including, but not limited to, telecommunication network, computer network such as the Internet or local area network (LAN), and the like. In some embodiments, MCU 220 may include a mandatory multipoint controller (MC) and optional multipoint processors (MPs). In operation, MCU 220 receives the audiovisual stream from each endpoint 210, processes the audio and video signals and forwards the audiovisual stream to the other endpoints 210 involved in the videoconference.

It is to be understood that though videoconferencing system 200 includes MCU 220, it is possible to implement a videoconference without a centralized MCU. For example, in an alternative embodiment, endpoints 210 may directly communicate with one another on a peer-to-peer basis. In yet other embodiments, one of endpoints 210 may act as a server or MCU to control and manage the videoconference. In those embodiments, the dedicated MCU 220 as shown in FIG. 2 can be omitted.

As described above, in conventional videoconferencing system, all the audiovisual streams from endpoints 210 are processed with the same configuration. Likewise, when recording the videoconference, audiovisual streams are treated in the same way as well. For example, the audiovisual streams can be rendered with the same resolution, coding scheme and format, and the audiovisual streams can be rendered with the same display parameters.

Figure 3:
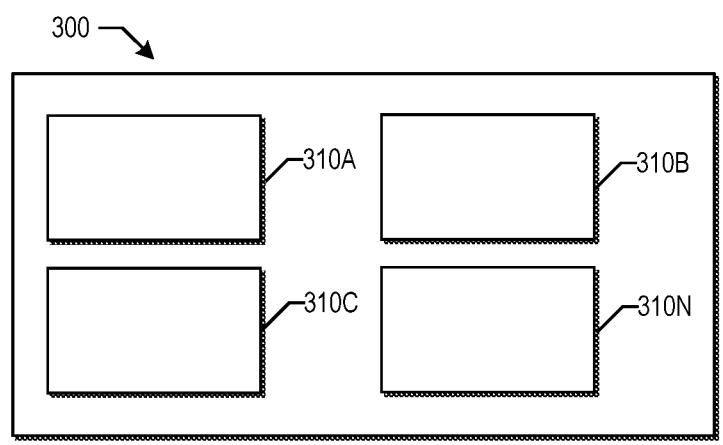
FIG. 3 is a schematic diagram of a conventional user interface for rendering audiovisual streams in a videoconference, in accordance with an embodiment of the present invention.

FIG. 3 shows a schematic diagram of a conventional user interface (UI), 300, for rendering a videoconference involving endpoints 210A to 210N, in accordance with an embodiment of the present invention. As shown, UI 300 includes areas 310A, 310B, 310C, . . . , and 310N that display the audiovisual streams from endpoints 210A, 210B, 210C, . . . , and 210N, respectively. An area may be a separate window or a part of a single window. Conventionally, areas 310A, 310B, 310C, . . . , and 310N have the same size to render the audiovisual streams of the same format, resolution, coding scheme and the like.

However, within a given time period, there is usually only one participant (or a few participants) in the videoconference talking, while the others are just listening. Processing or recording the audiovisual streams especially the video signals from those "silent" participants will cause unnecessary resource waste because such audiovisual streams carry little or no meaningful information. Contrary to the conventional videoconferencing system, in accordance with embodiments of the present invention, the audiovisual streams in a videoconference are adaptively processed or recorded with different configurations according to the sound level thereof.

Figure 4:
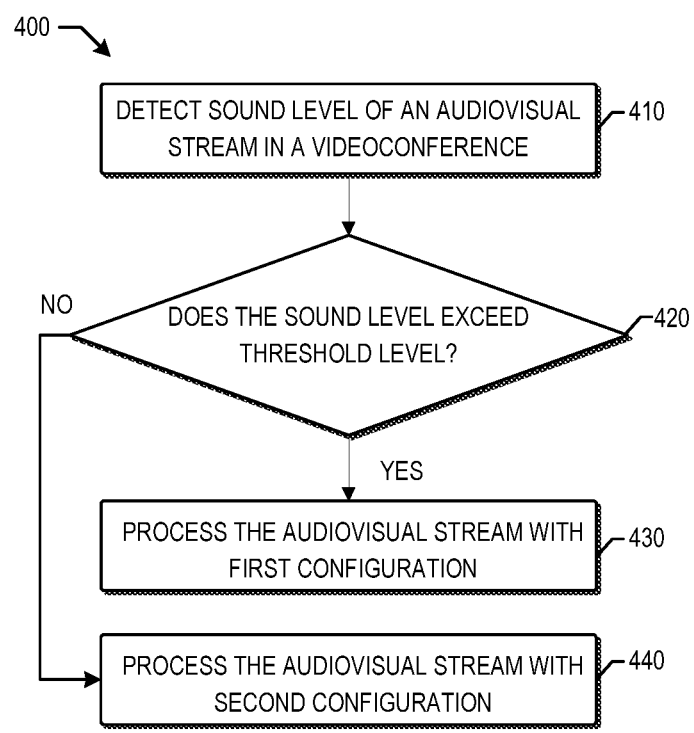
FIG. 4 is a flowchart depicting operational steps for processing audiovisual streams in a videoconference, in accordance with an embodiment of the present invention.

FIG. 4 shows a flowchart of audiovisual processing system, 400, for processing an audiovisual stream in a videoconference, in accordance with an embodiment of the present invention. Audiovisual processing system 400 may be applied to each of the audiovisual streams in the videoconference in order to process the videoconference in real time and/or to record the videoconference.

In step 410, audiovisual processing system 400 detects the sound level of an audiovisual stream in the videoconference. An audiovisual stream includes an audio component and a video component. To this end, in some embodiments, the audiovisual stream may be decomposed into audio signals and video signals. For example, decomposition of the audiovisual stream can be done at MCU 220. Example embodiments will be discussed in the following paragraphs. The audio signals are then analyzed to determine the sound level. It is possible to directly analyze the audiovisual stream to detect the sound level. In accordance with embodiments of the present invention, the sound level can be measured in a variety of ways. For example, in some embodiments, the sound intensity of the audio component in the audiovisual stream may be determined. Sound intensity or acoustic intensity is defined as the sound power per unit area. An approach of sound intensity measurement involves the use of two or more microphones located close to each other, normal to the direction of sound energy flow. The cross-power between the measured pressures may be computed and the sound intensity is derived from (for example, proportional to) the imaginary part of the cross-power. Alternatively, or in addition, in step 410, it is possible to measure the sound pressure or acoustic pressure which is the local pressure deviation from the ambient atmospheric pressure, caused by a sound wave. In air, the sound pressure can be measured using a microphone. Alternatively, or in addition, in step 410, the sound level can be measured using any other suitable metrics including, but not limited to, sound pressure, sound power, sound energy, sound energy density, sound loudness (which is a psychoacoustic correlate of physical strength of sound), or the like.

In step 420, audiovisual processing system 400 determines whether the sound level of the audiovisual stream exceeds a predefined threshold level. In some embodiments, the threshold level is specified by a human user, for example, according to experiences and/or experiments. In other embodiments, the threshold level may be automatically adapted based on ambient noise or other relevant factors.

If, in step 420, the sound level of the audiovisual stream exceeds the threshold level, then in step 430 the audiovisual stream is processed with a first configuration. If, in step 420, the sound level of the audiovisual stream is below the threshold level, then in step 440 the audiovisual stream is processed with a second configuration. That is, in accordance with embodiments of the present invention, the audiovisual streams in the videoconference are processed in different manners depending on their sound levels.

In general, the first configuration adopted in step 430 consumes more resource than the second configuration adopted in step 440. In other words, the second configuration is more resource-effective than the first configuration. This would avoid unnecessary resource waste. More particularly, if the sound level of the audiovisual stream is relatively high, it is very likely that the participant is talking in the videoconference. Accordingly, more resources can be allocated to process and/or store the associated audiovisual stream with high quality. On the contrary, a relatively low sound level may indicate that the participant does not talk but just listens at that moment. In this case, the second configuration may be applied to avoid wasting resource to process the audiovisual stream.

For example, in some embodiments, the first and second configurations may be associated with different quality levels of the audio and/or video signals. In such embodiments, if the sound level is high, the audiovisual stream may be processed in step 430 with a first quality level. Otherwise, if the sound level is low, the audiovisual stream may be processed in step 440 with a second quality level. In general, the first quality level is higher than the second quality level. As used herein, the quality level indicates the fidelity of audio and/or video components of the audiovisual stream. For example, the quality level of an audiovisual stream relates to the resolution, frame rate, code rate, compression rate, coding scheme, and/or other factors of the video component of the audiovisual stream. The quality level may also relate to the frequency response, signal to noise ratio (SNR), stereo crosstalk, output power, coding scheme and/or other factors of the audio component of the audiovisual stream.

The audiovisual stream with high sound level may be processed with high fidelity of the audio and/or video components. By way of example, the audio component may be processed with higher frequency response and lower SNR. The associated video component may be processed with higher resolution, higher frame rate, higher code rate, less compression loss, and the like. On the other hand, the audiovisual stream with low sound level may be processed with low fidelity of the audio and/or video components.

In recording the videoconference, the first and second configurations may be associated with different formats for the audio and/or video files. That is, if the sound level exceeds the threshold level, the audiovisual stream is recorded in step 430 with a first format. Otherwise, if the sound level is below the threshold level, the audiovisual stream is recorded in step 440 with a different second format. In general, the second format is more resource-effective than the first format. For example, in some embodiments, a file of the second format can be generated with less computing resource than a file of the first format. As such, the audiovisual stream of the second format can be recorded more quickly. Alternatively, or in addition, a file of the second format can be processed and/or stored with less storage resource.

By processing the audiovisual streams with different configurations depending on their sound levels, those audiovisual streams with low sound levels are processed with less computing and/or storage resource. In a videoconference, low sound levels usually indicate inactivity of the associated participants, as described above. By consuming less resource on such audiovisual streams, the unnecessary resource waste is avoided. In this way, the videoconference can be processed and/or recorded in real time more smoothly. Moreover, the recorded videoconference can be stored with less storage capacity.

Specifically, in some embodiments, in step 440, it is possible to discard some or all of the audiovisual streams with low sound levels. In one embodiment, if it is determined in step 420 that the sound level of an audiovisual stream is below the threshold level, the audiovisual stream will not be discarded in step 440 without being processed or recorded. Alternatively, in another embodiment, in step 440, it is possible to use another threshold level which is lower than the threshold level used in step 420. If the sound level of an audiovisual stream is below this low threshold level, the audiovisual stream is not processed. No meaningful information will be lost because the participant associated with the audiovisual stream is entirely inactive in the videoconference. If the sound level is between the two threshold levels, the audiovisual stream may be processed with the lower second configuration.

In some embodiments, the sound level detected in step 410 is a transient sound level. As a result, once the sound level of an audiovisual stream is detected to be lower than the threshold level, the audiovisual stream will be processed with the second configuration. In some cases, this might cause too frequent a switch between the first and second configurations. For example, when a user is having a conversation with another in the videoconference, the user might stop talking to listen and start talking again. In order to deal with this situation, in some embodiments, the sound level detected in step 410 may be an average sound level of the audiovisual stream within a given time period. As such, when the user temporarily stops talking for a short while, the audiovisual stream can still be processed with the first configuration, rather than immediately reducing the quality level.

Alternatively, in other embodiments, the sound level detected in step 410 may be given a tolerant time window. In such embodiments, when the sound level of an audiovisual stream falls below the threshold level, the length of the time interval during which the sound level remains below the threshold level is determined. If this time length is shorter than a threshold length, then it is unnecessary to change the processing configuration and thus the audiovisual stream will still be processed with the first configuration in step 430. That is, in such embodiments, the lower second configuration will be used only when the sound level of an audiovisual stream is lower than the threshold level for a period of time.

Figure 5:
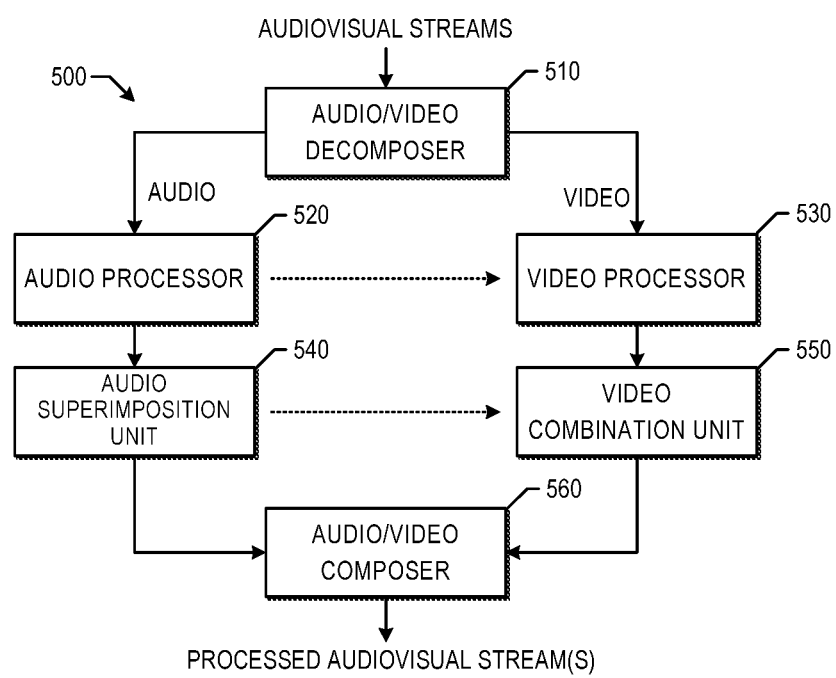
FIG. 5 is a block diagram of a device for processing audiovisual streams in a videoconference, in accordance with an embodiment of the present invention.

FIG. 5 shows the block diagram of a device, 500, for adaptive processing of audiovisual streams in a videoconference, in accordance with embodiments of the present invention. In some embodiments, device 500 and MCU 220 may be co-located in a same physical machine. In other embodiments, device 500 may be a separate device from MCU 220.

As shown, in this embodiment, device 500 includes audio/video decomposer 510 which receives audiovisual streams from endpoints 210 and decomposes each of the audiovisual streams into an audio component and video component. The audio and video components are then fed into audio processor 520 and video processor 530, respectively.

Audio processor 520 detects the audio components and sound levels thereof. Audio processor 520 classifies the audio components into two groups based on the sound levels. The audio components in one group have sound levels above the threshold level and therefore will be processed with the first configuration (step 430), while the audio components in the other group have sound levels below the threshold level and therefore will be processed with the second configuration (step 440). Audio processor 520 informs video processor 530 of the classification of audio components. For example, in one embodiment, audio processor 520 sends identifiers of audio components in either or both of the groups to video processor 530.

Video processor 530 processes the video components based on the classification of the audio components. For example, for those audio components with high sound levels, video processor 530 may process the corresponding video components with high quality level. For those audio components with low sound levels, video processor 530 may process the corresponding video components with low quality level. Specifically, in one embodiment, the audio components with low sound levels may be discarded by audio processor 520. Accordingly, video processor 530 may directly discard the corresponding video components.

In some embodiments, the processed audio components are sent from audio processor 520 to audio superimposition unit 540. Audio superimposition unit 540 superimposes the processed audio components whose sound levels exceed the threshold level into one audio channel. In some embodiments, audio superimposition unit 540 further generates an auxiliary signal which indicates a ratio of the sound levels of the audio components of different audiovisual streams. This auxiliary signal is sent to video combination unit 550 which receives video signals from video processor 530.

Video combination unit 550 may analyze the auxiliary signal and determine a ratio of sizes of the corresponding video streams. Then the audio signals may be combined by video combination unit 550 into one video channel according to the ratio of sizes. That is, in such embodiments, the sizes of the processed audiovisual streams to be displayed are determined based on the sound levels of audio components. For example, the sizes of videos may be proportional to the sound levels of the respective audio signals. An audiovisual stream with a higher sound level may be rendered with a larger size.

The processed audio and video signals are provided by audio superimposition unit 540 and video combination unit 550, respectively, to audio/video composer 560. Audio/video composer 560 composes the processed audio and video components into an audiovisual stream for display to the user.

It is to be understood that audio superimposition unit 540 and/or video combination unit 550 can be omitted in some embodiments. That is, the audio and/or video components can be processed as separate streams. Moreover, in the example shown in FIG. 5, the processed audiovisual streams are combined into one stream and thus will be displayed in a single window. In alternative embodiments where the audiovisual streams are processed and rendered separately, the processed audiovisual streams may be displayed in different windows. The sizes of these windows may be decided depending on the sound levels of the respective audiovisual streams, for example.

According to embodiments, when rendering the processed audiovisual streams, the display areas for displaying audiovisual streams from different endpoints may have different appearances depending on the sound levels. In general, the audiovisual streams with higher sound levels may be more highlighted.

Figure 6:
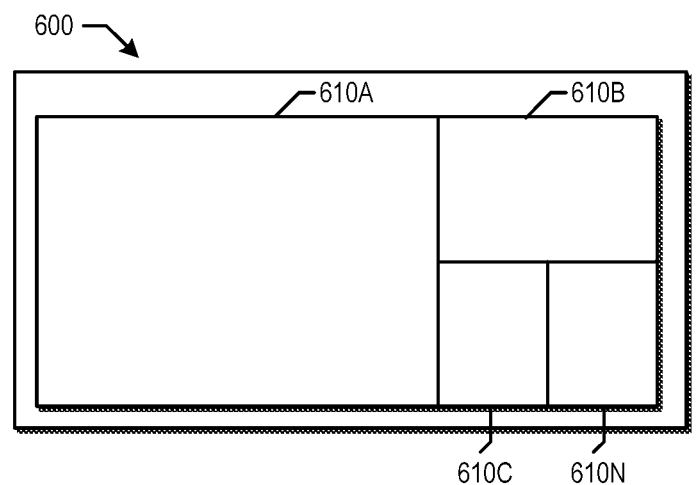
FIG. 6 is a schematic diagram of a conventional user interface for rendering audiovisual streams in a videoconference, in accordance with an embodiment of the present invention.

FIG. 6 shows a schematic diagram of UI 600 for rendering audiovisual streams in a videoconference involving endpoints 210A to 210N, according to embodiments of the present invention. In this example, UI 600 includes display areas 610A, 610B, 610C, and 610N which are parts of a single window. Alternatively, in other embodiments, the display areas may be separate windows or other UI controls. As shown, the sizes of display areas 610A, 610B, 610C, and 610N are determined based on the sound levels of the respective audiovisual streams. In this example, the audiovisual stream rendered in display area 610A has the highest sound level. As a result, the audiovisual stream is processed with the highest quality level and rendered in the largest display area 610A. In addition to the size, display areas 610A, 610B, 610C, and 610N may have different appearances such as positions, shapes, colors, patterns and the like, such that the audiovisual streams with high sound levels can draw more user attention.

In some embodiments, the audiovisual stream may be discarded if its sound level is below the threshold, as described above. In one embodiment, the corresponding display area may be directly removed from the display screen. For example, if the user at endpoint 210C is silent and thus the sound level is below the threshold level, the audiovisual stream from endpoint 210C may be discarded and display areas 610C may be removed. Alternatively, in another embodiment, display area 610C may display a predefined pattern or picture. For example, display area 610C may display a solid color such as black, white, or gray.

Additionally, appearances of the display areas may be changed dynamically over time. For example, in the status as shown in FIG. 6, the audiovisual stream rendered in display area 610A has the highest sound level. As time passes, the audio level of the audiovisual stream from endpoint 210A may drop and the audio level of the audiovisual stream from endpoint 210B may become the highest. At this point, the appearance of the corresponding display area 610B may be changed by enlarging, repositioning and/or otherwise highlighting that display area.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a plurality of audiovisual streams in a videoconference, the method comprising:

detecting a sound level of an audiovisual stream in a videoconference based on determining an average sound level of the audiovisual stream over a predefined time period, decomposing the audiovisual stream into an audio component and a video component and analyzing the audio component to determine the sound level wherein analyzing the audio component is based on at least one of sound intensity, sound pressure, sound power, sound energy density and sound loudness;

in response to the sound level exceeding a first predefined threshold level, processing the audiovisual stream with a first configuration based on a first quality level wherein exceeding the first predefined threshold level comprises determining that the sound level of the audiovisual stream does not fall below the first predefined threshold level for a sequential time period greater than a predefined threshold time period;

in response to the sound level being below the first predefined threshold level and above a second predefined sound level, processing the audiovisual stream with a second configuration based on a second quality level, wherein the second configuration is more resource-effective than the first configuration and the second quality level is lower than the first quality level wherein the first quality level and the second quality level are based on signal-to-noise ratio and at least one of frequency response, stereo crosstalk, or output power;

in response to the sound level being below the second predefined sound level, discarding the audiovisual stream;

superimposing the audio component of the audiovisual stream with audio components of further audiovisual streams associated with the videoconference wherein the further audiovisual streams are processed with the first configuration;

combining the video component of the audiovisual stream with video components of the further audiovisual streams; and rendering the audiovisual stream in a display area, wherein an appearance of the display area is determined based on the sound level of the audiovisual stream.

* * * * *